United States Patent [19]

Schelzig

[11] 4,377,156
[45] Mar. 22, 1983

[54] SOLAR COLLECTORS AND PROCESS FOR THE MANUFACTURE THEREOF

[76] Inventor: Manfred Schelzig, Ziegler Strasse 6, 8900 Augsburg 22, Fed. Rep. of Germany

[21] Appl. No.: 23,266

[22] Filed: Mar. 23, 1979

Related U.S. Application Data

[63] Continuation-in-part of Ser. No. 890,915, Mar. 28, 1978, abandoned.

[30] Foreign Application Priority Data

Mar. 28, 1977 [DE] Fed. Rep. of Germany ....... 2713628

[51] Int. Cl.³ .............................................. F24J 3/02
[52] U.S. Cl. ................................................. 126/450
[58] Field of Search ........................ 126/450, 448, 447

[56] References Cited

U.S. PATENT DOCUMENTS

| 3,873,407 | 3/1975 | Kumata et al. | 264/46.6 |
| 4,120,285 | 10/1978 | Nugent | 126/448 |
| 4,120,288 | 10/1978 | Barrett | 126/450 |

Primary Examiner—Carroll B. Dority, Jr.

[57] ABSTRACT

A carrier or frame for solar collectors, having a rigid-cellular plastic filling body completely or partially coated with a tight-sealing synthetic top layer. A process for the manufacture thereof which involves the use of casting molds for forming the cellular filling body and for applying a liquid resin thereto as a top layer.

26 Claims, 6 Drawing Figures

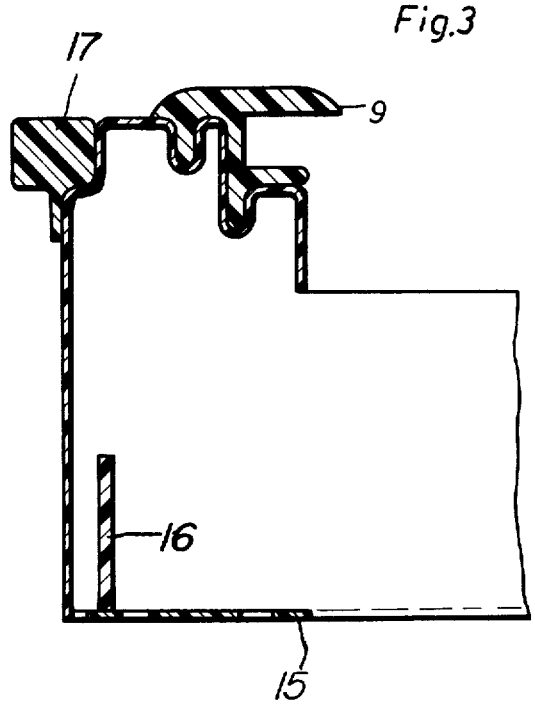
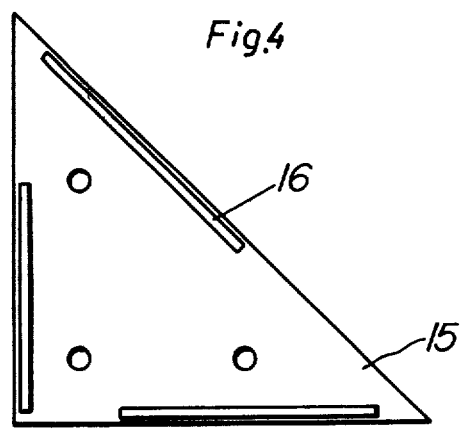

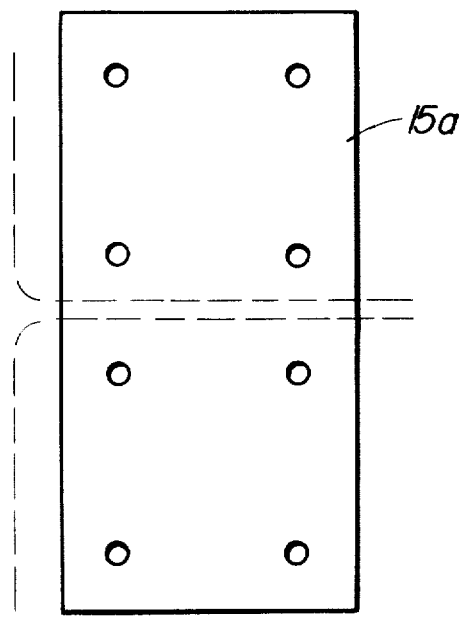
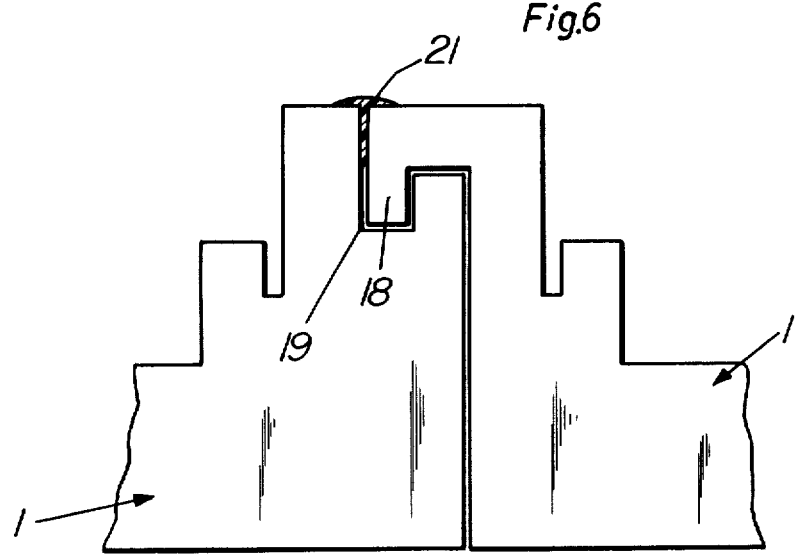

4,377,156

SOLAR COLLECTORS AND PROCESS FOR THE MANUFACTURE THEREOF

RELATED APPLICATION

This is a continuation-in-part of Ser. No. 890,915 filed Mar. 28, 1978, now abandoned, the disclosure of which is incorporated herein as is fully set forth.

BACKGROUND OF THE INVENTION

The invention relates to solar collectors and, specifically a frame or carrier element therefor, having a rigid-cellular plastic filling body completely or partially formed with a tight-sealing synthetic top layer, and to a process for the manufacture thereof.

It has been known to mold synthetic parts, specifically carrier inserts for solar collectors see German patent publication (DOS 2,510,321.) These synthetic manufactured inserts are mounted within metallic frame casings and serve to stack any required booster components such as solar collectors and glass, masking frames, etc., according to their end-use. The synthetics used for such inserts may be of a rigid-cellular plastics type as described in German patent application (DOS 2,532,174 or German utility Pat. No. 7,630,194.) Inserts such as these are used as non-lead bearing components in metal casings, and serve for reinforcement and attachment purposes as described in German utility Pat. No. 7,624,195.

The known metallic casings require the use of these synthetic inserts to provide the thermal damping or insulation of applied solar-radiated heat because the metal itself—based on its high thermal conductivity—would pass on the solar-radiated heat to the environment to an almost undiminished degree. On the other hand, the known synthetic inserts are insufficient to provide the strength, rigidity, and ruggedness necessary to outdoor use. Because of the extensive tooling required in their production, the manufacture of known metal casings is expensive; furthermore, their weight is too high for customary roof designs. They represent detrimentally effective thermal bridges, and their assembly is expensive. Casings made of rigid-cellular plastics alone on the other hand do not meet the requirements occasioned by their special use. Casings used as solar collectors are exposed to considerable temperature fluctuations and constantly varying environmentally produced damaging effects. It must be taken into account that carrier frames for solar collectors such as these are used alike in regions having a moderate climate and those of subtropical climate, where they are exposed to high humidity and enormous solar radiation levels. Additionally, carrier frames such as these must resist jolts and impacts caused by their mounting and/or transport.

Generally known molded parts may have a core of rigid cellular plastic, which is completely or partially coated with a tight-sealing protective layer (see German patent publication DOS 2,506,414.) The protective layer serves to give the molded part an optically attractive appearance by being more scratch resistant or more suitable for lacquer coating than just a rigid cellular plastic body. Molded parts such as these should not be exposed, however, to extreme weather conditions, specifically rough temperature fluctuations, because this may lead among other effects to a rapid peeling off of these layers.

The object of the invention is to produce a molded part, specifically a carrier frame for solar collectors, which has a low weight and good insulator property as well as a long rated service life despite multi-use conditions and environmental effects, and which can be simply handled and inexpensively manufactured.

SUMMARY OF THE INVENTION

According to the invention, a carrier frame of the above indicated type is developed with a top layer of rigid stabilized resin component, as the load-bearing element, integrally bonded to a body of the foamed plastic by chemical cross-linkage. In this way, because the top layer is the supporting element, the filling body, although made of rigid-cellular plastic is protected against weather- and jolt-caused damage. This makes the use of lightweight foaming mixtures feasible for use even under extreme environmental conditions. By means of this integral chemical bonding, the use of expensive and specifically thermally undesirable metal frames or casings can be avoided. The foam may be of a low density type, so that a light-weight and also a more readily manipulatable molded part is obtained. The top layer can be formed to resist not only strong impact, e.g., hailstones, without fissures, but even where fractures appear within the filling body itself, the top layer would have no damage effecting either its operation or service life because of its inherent stability and strength.

In one embodiment, a fiber structure may be embedded in the filling body, so that the strength of the molded part in general and specifically at preferred points can be improved. For this purpose, the fiber structure is practicably composed of a mineral or synthetic based material of a long-fiber type. For intimate cohesion, it is of advantage to have the fiber structure completely interspersed with foam. In development of this embodiment, the fiber structure may be in the form of a fiber bunch which may also be an important factor in the simple manufacture of the molded part, since adapting the diameter of the fiber bunch to the size of the filling body, any desired strength matching that size can be maintained. For better results, the fiber structure may be embedded peripherally in the casing edge so that an overall equal strength is obtained.

In another embodiment, the casing or frame edge may be profiled in a predetermined manner to accommodate a cooperatively profiled section of a mounting masks, and/or collector. Thus, a simple assembly of the collector may be facilitated without any need for additional attachment means. It is of advantage also to develop the outer casing edge with sealing-connection profiles facilitating connection to other casings, thus permitting the serial compound arrangement of casings or frames. In this connection, the casing edge may be developed as slots, in which the sealing and/or connector means may be in the form of a mating cooperatively profile, providing a positive lock. The sealing and/or connector profiles need only to be slid into the corresponding slots to be locked in there. This compound arrangement can be further improved by having slots running all around the periphery of the casing.

A useful feature is the provision of a glass weave or glass fleece mat on the bottom surface of the molded part so that dimensional stability and thermal insulation are increased in the downward direction that is against the supporting ground surface.

Angle brackets which can be formed in the molded part, further simplify a rapid interconnection of several carrier elements. For simple attachment to the supporting surface, the angle bracket may be equipped with screw holes. For better mounting in the filling body, the angle brackets may have ridges projecting into said filling body, which can be shaped in many applicable selective ways.

In a further expedient development, one or more mounting parts such as glass masks, absorber parts including connections for reciprocable forward and return travel, connector braces or the like may be connected to the casings by moulding them in place. This has special production engineering advantages, which are still further increased by pouring mounting parts assembled to a single unit into the casing. Furthermore, this produces an extremely solid interconnection of individual components with the casing. To improve the hold on the casing it would be of pertinent advantage to equip the mounting parts with fastener attachments.

In one process according to the present invention, the molded carrier part can be manufactured in an extremely efficient way in a single casting mold by first pouring a liquid synthetic resin into the opened casting mold, whereupon the mold is closed and the contents are formed into the outer hard surface layer. Thereafter, a resinous mixture for the filling body is inserted and expansion foamed, forming the body in situ and bonded to the outer body.

Another process according to the invention for manufacturing the molded carrier part consists in pouring foamed plastic into the casting mold first forming the filling body, transferring the latter to a second casting mold which is larger in size to accommodate the protective outer layer and centering said body in it, and thereafter forming the top layer by putting liquid synthetic resin into the layer mold.

If a fiber-reinforcement structure is employed, it just needs to be inserted in the mold prior to foaming the filling body.

In a further development of the process, provision is made for incorporating mounting parts in the mold prior to foaming the filling body, such as glass masking and absorber means including connections for forward- and return- travel, connector braces or the like. Thus, in a simple manner, the interconnection of collector components with the casing can be obtained. The practical procedure is to insert the mounting parts in a single assembly unit into the mold. The special advantage here is that the assembly unit is a lost part of the mold being embedded therein.

Full details of the present invention are set forth in the following description and in the accompanying drawing of the preferred embodiments and variations of the invention.

DESCRIPTION OF THE FIGURES

In the drawings:

FIG. 3 is a view similar to FIG. 2 showing still another embodiment.

FIG. 4 is a plan top view of the interior corner profile of a casing.

FIG. 5 is a top plan view of another corner profile.

FIG. 6 is a view showing schematically the junction between two molded carriers.

DETAILED DESCRIPTION

Figure 1:
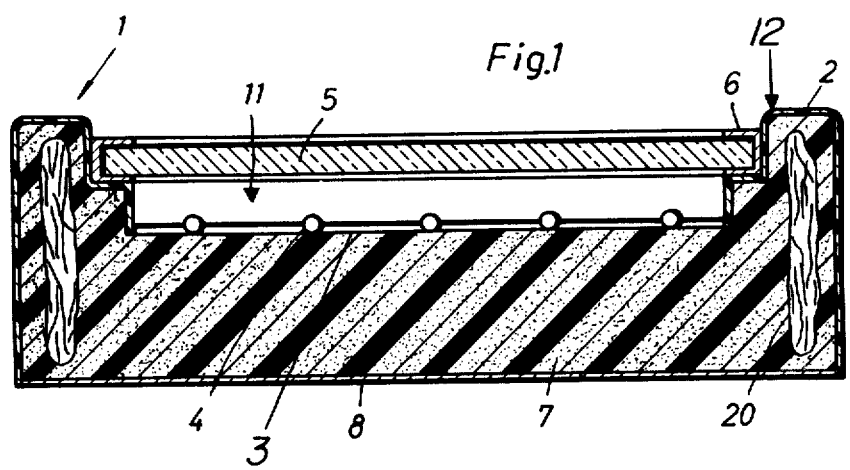
FIG. 1 is a cross-sectional view of a molded solar carrier according to the present invention.

As seen in FIG. 1, a molded solar frame or casing, generally depicted by the numeral 1 is formed of unitary molded part, having a substantial thickness comprising a filled body 7 and an outer or top layer 2 having a central depression 11 and surrounding peripheral edge 12. The top layer 2 does not need to cover the entire outer surface but preferably only the exterior surface and the inner edges normally open to weather. The top layer is formed of a coating of a rigid and stable synthetic resin while the body 7 is formed of an expanded foam plastic. In the casing's interior bottom 3, a solar collector 4 is arranged in the customary way. In the illustration, the collector comprises adjacently placed blackened tubes through which, for example may pass a fluid, gas or the like for heating, and which are interconnected by side light absorbing panel means. A glass covering plate 5 is seated on an interior shoulder spaced above the collector 4 and is provided along its edge with a seal member 6 which may be integrally formed or attached to the molded casing. Any other form of solar collector, adsorbing panel or the like may be employed.

The body 7 is preferably a rigid expanded polyurethane foam having a density of between 50 to 120 kg/m$^3$. In the casing's peripheral edge area, fiber structures 20 can be inserted for reinforcement. On the other hand, the body may be reinforced by selectively varying the density of certain areas. For example, it is feasible to increase the foam density at specified points, such as adjacent the top layer 2 or along the outer edge to a degree ranging preferably from 600 to 1000 kg/m$^3$.

Suitable fiber structures 20 include humidity indifferent fiber weaves or also single fibers. Thereby, the fibers used will exclude any capillary effective type. For better stability, specifically long-length fiber types are preferably used. Useful are fibers having a mineral such as glass or synthetic basis for instance polyester or polyamid. The fiber structures can be located, of course, at the most varied points of the filling body.

For reinforcement purposes, specifically a fiber bunch 20 or circular-knit fabric or fiber glass is useful, the diameter of which can be adapted approximately to the size of the molded past. Thus, the mesh width of the circular knit fabric is so sized that the fiber structure is completely interspersed in the expanded plastic while the plastic is still in a liquid state and shortly after injection, so that each single fiber as well as the interstices therebetween is enclosed by foamed plastic. The circular-knit fabric used is preferably a tube, which is also filled with a strand of, or, several, glass rovings. The amount of roving used is optional and determined only by the mechanical strength to be obtained. Empirically, the amount of roving used is set between 15 and 50.

The top layer 2, which should be hard, compact and weatherproof, represents the structural support element of the molded part. There are various processes for manufacturing the top layer, of which two will be explained in more detail below. The top layer 2 as well as the filling body 7 may consist of polyurethane although the top layer 2 must have a high density for insuring the required supporting strength. Particularly suitable for forming a stable and hard top layer is a liquid synthetic resin mixture of multifunctional polyether alchols with aliphatic polyisocyanates. A specifically useful mixture ratio of both of these components is between 1:0.7 and 1:1.3. Another especially suitable formula for the top layer comprises 20% by weight of a hydroxyl group containing, highly cross-linked polyester, 21% by weight of multifunctional polyether alcohols, 0.5% by weight of dibutylstannic dilaurate or stannic octoate, 0.5% by weight of ultraviolet absorber, 12% by weight of pigments such as $Fe_2O_3$, $TiO_2$, $CrO_3$, and 46% by weight of isophoronedi-isocyanate. The remainder of the material, i.e. the isocyanantes, may be chosen and distributed so that the top layer may be comprised of non-light resistant isocyanates providing either a light reflective or a light absorbing surface, and/or both an outer light reflective and an inner light adsorbant surface.

To give the molded part an appearance according to its end-use, light-fast pigments non-fading are added to the top layer. According to the desired properties, the percentage of these colorants ranges from 5% to 10% by weight (based on the total mixture weight.)

The material particularly useful for the filling-body is a mixture of polyether polyolenes with isocyanates, having a density between 50 and 120 $kg/m^3$, preferably 70 $kg/m^3$ in the expanded foam state.

For purposes of thermal damping or insulation, the bottom exterior surface of the molded part is coated with a mat 8 of a glass fleece or glass weave. Thus, any useless heat dissipation into the supporting ground surface may be blocked or at least considerably reduced. This surface may or may not be covered with a top or outer layer 2.

To improve the thermal stability of the polyurethane foam, the interior bottom 3 of the casing can be topped by a metal film. Preferably the latter will have the property of reflecting the infrared radiation impinging on the collector. It also effects a better utilization of radiated heat. Useful for this purpose is an aluminum made metal film. But the same result is produced also by fine glass splinters or glass beads, which are scattered onto a pressure sensitive adhesive and form a closed-cell layer on the polyurethane foam surface.

Figure 2:
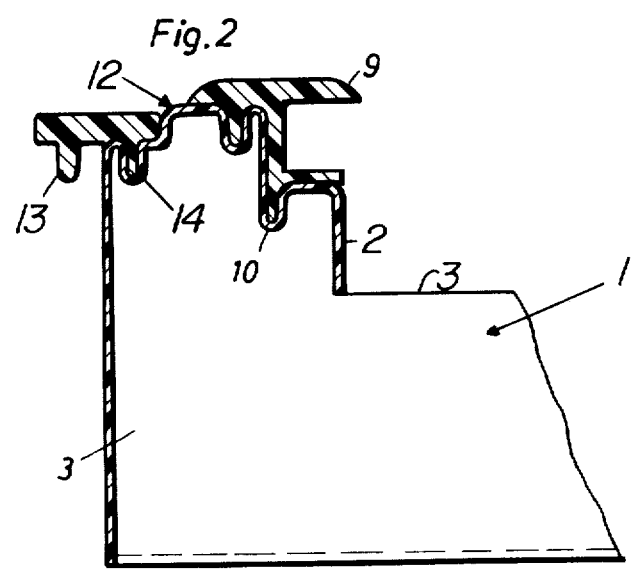
FIG. 2 is a partial cross-section view of another embodiment of the present invention.

As seen in FIG. 2 the molded carrier 1 may be formed to secure a glass masking strip 9 by providing one or more slots 10 into which a corresponding portion of the masking strip 9 may be snapped. In this embodiment the peripheral edge or a portion thereof is provided with a pair of stepped ridges in which the slots 10 are formed. These ridges and slots can be formed in situ during the molding process itself or afterwards by cutting or heat pressing the profile of the ridge and slot therein the cooperative portions of the masking strip 9, and the ridges and slots 10 are formed so as to insure a secure and tight locking of the strips to the carrier. The masking strip 9 prevents ambient air from penetrating into the interior of the casing, in which the solar collector is arranged. The masking strip 9 has to meet also a retaining-functional requirement, for the air in sealed-off internal space 11 expands because of heat radiation, and considerable increase pressure is produced. For this reason, two rows of slots 10 are preferred so that any pressure fluctuation produced which might break the seal is prevented. A pressure relief valve and outlets for condensation water can be provided with molded carrier itself or additionally thereto.

To combine several collector carriers in adjacent arrangement, a connector strip 13 may be used, which is accommodated in a slot 14. Preferably slot 14 is developed at casing edge 12 around the entire periphery so that any simple series arrangement of carriers is feasible, because they just have to be set next to each other and the connector strip inserted in the matching slots. In this way, a simple and rapid assembly of collector carriers is feasible. Preferably the connector strip is of an elastic type, so that any thermal expansions can be easily balanced as with masking strip 9.

Both the masking strip 9 and the connector strip 13 may be made of rubber, synthetic plastic or the like. The slots 14 and the connector strip 13 being formed and functioning cooperatively similar to that of strip 9 and slot 10.

In the embodiment according to FIG. 3, the interconnection of single collector tanks is not effective via a connector strip. On the contrary, in the bottom area, preferably in their corners, special brackets 15, of light metal such as aluminum are molded in situ; these are provided with screw holes, in which fastening bolts can be attached. By means of these brackets, the collector carrier can be attached to the supporting surface. Instead of a screw connection, clamping means may be used. Any other known attachment means, however, are also applicable. To give brackets 15 a better hold on the molded carrier itself, and to contribute to its reinforcement they are provided with vertical members 16, which are manufactured from a light metal as is the bracket 15. These members 16 can be attached to or welded to the bracket in any manner.

By using brackets such as shown, the use of special connector strips according to FIG. 2 can be relinquished. In the gap between individual collector casings only a simple seal strip 17 may be used.

In FIG. 4 an embodiment of angle bracket 15 is shown which is triangular in shape and has three vertical members 16 and has three screw holes. Preferably this bracket is inserted into the outer areas of the bottom surface.

In FIG. 5, a further embodiment of bracket is shown. It has a four-cornered preferably rectangular cross-section. This bracket 15a is practically manufactured in one operating step together with collector carrier and projects laterally from the bottom area of the casing, so that on the laterally projecting section of bracket, another collector carrier can be set up for connection and screwed together. The second carrier is formed with a matching recess or slot. It is evident that there are many possible modifications feasible for the bracket, e.g., a four-cornered bracket is conceivable, with which four casings can be joined together. The ridges developed on the bracket can be plate-shaped to fit into corresponding slots or recesses. To increase their hold, profiled panels are feasible also.

In FIG. 6, an embodiment is shown, where two carrier casings can be joined by positive interaction. In this case, one casing has an overhanging and angularly offset edge 18, which engages a matchingly developed recess 19 of a second carrier casing. To seal the gap between both casings, a packing 21 can be clamped between the interlocking edges 18 and 19.

In a further embodiment, the components for a carrier casing, such as glass masking, absorber panels including the connections for reciprocal travel, connector braces, pressure relief valves, condensation water outlets of the like, are integrally cast with the carrier casing mold. This has great production engineering advantages, which can be increased specifically by combining the parts in a single assembly unit and inserting same in the mold for forming the casing. On foaming or casting the casing, these mounting parts are then in solid integral connection with the foam body, and special attachment means can be omitted, and the assembly cost for retroactively mounting the mounting parts can be saved. To increase the hold on securement on the casing body anchoring members may be provided on the mounting parts, which preferably, after forming of the casing are molded into the body or top layer so as to be "lost." The assembly unit can be formed, as a shell around the mounting parts, e.g., by a synthetic layer, in which the mounting parts are accommodated and retained. This is of particular advantage for the subsequently described processes, because of the simple way such units can be inserted in the mold. For best results, the assembly unit may be part of the mold, e.g., an upper mold half, whereby it can be considered as a sprue or lost part of the mold. Thereby, the assembly unit on this mold half is so developed that the remainder of the mold following the formation of the casing can be easily removed from the assembly unit, which, after forming the casing of course is solidly connected with it.

In the following, two processes are described for manufacturing the molded casing. With both processes, a mold matching the dimensions of the finished part to be manufactured is required. The molds can be produced according to known manufacturing methods and comprise, according to the desired reproducibility factor, synthetic resin, aluminum, or steel. The molds are so treated that the manufactured molded casing can easily be removed.

According to one process, a casting mold is used, which in the case of manufacturing a casing molded part consists of two shells.

Into these shells—in an open position of the mold—an injector device is introduced. In the latter, metering devices are provided, which continually bring together the individual components for the liquid synthetic resin and intensively blend them in a mixing device. Finally, the liquid synthetic resin mixture for forming the top or outer layer is high-pressure injected against the shells.

The synthetic resin is applied in a layer of 0.5 to 3 mm. to the shells. The cross-linkage between the polyurethane mixture components is controlled by catalysts such as dbtl(di-butyl-tin dilaurate). In this case, the cross-linkage must be so controlled that no runoff of liquid synthetic resin from the vertical mold walls can occur, i.e., the cross-linkage starts immediately.

As initially mentioned, the preferably used liquid synthetic resin is polyurethane, namely specifically a mixture of multi-functional polyether alcohols with aliphatic polyisocyanates. The compact synthetic layer produced in that way is non-adhesive on its surface within about 2 to 4 minutes.

In the manufacture and preliminary cross-linkage of a dense outer layer, the above described fiber reinforcement is inserted in one of the shell molds. Preferably both ends of the fiber strand are joined so that it cannot be shifted within the mold. Finally, both shells are closed and locked by suitable obturator means to make any automatic opening impossible.

On closing the mold, it is put into a furnace for heatup, preferably in a continuous furnace, where it is heated from all sides to a degree between 30° to 80° C. For best results, the continuous furnace is a hot-air furnace type, where the air is heated by thermal oil heaters.

The reason why the heatup of molds is important is because, in this way, the synthetic resin of the top layer is cross-linked faster and better, and accordingly, reaction times are favorable and shorter mold removal times for the production of rigid expanded plastic are obtained.

Thereafter, the material for forming the foam body is injected into the mold. As already initially indicated, the foam is a mixture of polyether polyolene with isocyanates. These mixtures are provided with a foaming agent, preferably trichloromonofluoromethane. The reaction rate of the mixture is controlled by suitable activators, such as tertiary amines. The components of the foam mixture are brought together in a chamber by suitable metering devices, homogeneously mixed and fed into the mold according to the well known injection molding techniques. The liquid synthetic resin components of the body react and expand and a cross-linkage of this foam with the already pre-cross linked top layer occurs, so that, following the cross-linkage and/or solidification of the poly-urethane foam, an intimate and integral fusion of both layers is effected. Subsequently, the mold is opened, and the finished molded part removed from it. The emptied mold then is cleansed from any residual synthetic material present, and put into recirculation in the production process.

According to the second process, the casting mold consists of more than two parts.

A first mold is sized by the known thickness of the top layer to be applied after the foaming of the filling body. Into the hollow space of this mold, the above described reinforced-fiber material is inserted. Subsequently, the mold shells are closed and the closed mold heated up in a continuous fornace as aforementioned. Finally, the reaction mixture for forming the rigid expanded foam is put into the mold by injection-molding processing means. On expansion and pre-cross-linking of the reaction mixture, the mold is opened and the molded body removed. This molded body forms the filling body of the molded part. This filling body subsequently is inserted into and centered in a second casting mold, the hollow space of which is larger than the first and matches the final dimensions of the molded part to be manufactured.

The second casting mold is closed and vertically clamped into a mold holder device so that the filling body is located at the bottom end of the mold. At the top of the mold, a rising pipe is arranged. Into the mold clamped in that way, the liquid polyurethane synthetic resin required for the top layer is poured.

Such an amount of synthetic resin must be fed into the mold sufficiently to completely evacuating the air contained in the mold. The air can exit from the mold via the rising pipe.

The reaction mixture is so activated that a cross-linkage of polyurethane can occur only after the mold is completely filled. Because the filling body, which was finished first, still has not been completely cross-linked, an integral bond between top layer and filling body is produced. To accelerate the cross-linkage, the mold is reheated to a temperature level preferably set at 70° C. On completed cross-linkage of the compact top layer, the mold is opened and the finished molded part removed.

To reinforce the top layer fiber mats are used which can be cut in any suitable manner. According to the first process, initially a first top layer is injected into the mold, whereupon fiber mat strips are inserted and sprayed over with a second layer of the top layer material. In the same way, brackets can be inserted in the mold hollow space. Slots can be produced together with the molded part by matching mold shell developments or suitable inserts. In the second process, the reinforcement and brackets can for example be placed inside the second or larger mold whereupon the material forming the top layer can be inserted.

As it has been seen, various embodiment modifications and variants have been disclosed. Others will be obvious to those skilled in this art. Accordingly, it is intended that the present disclosure is to be taken as illustrative only and not limiting of the invention.

What is claimed is:

1. A molded solar collector carrier comprising a rigid-cellular polyurethane foam filling body coated with a tight sealing polyurethane top layer, having a density and rigidity greater than said filling body, said top layer being formed from a mixture of multifunctional polyether alcohols with a combination of non-light resistant and light resistant aliphatic polyisocyanate compositions, said aliphatic polyisocyanates being distributed in said mixture so that the inner surface is formed non-light resistant and the outer surface is light-resistant, said top layer being the supporting component of said carrier and being integrally bonded with said filling body by chemical cross-linkage means.

2. The carrier according to claim 1, wherein the mixture ratio between polyether alcohols and polyisocyanates ranges from 1:0.7 to 1:1.3.

3. The carrier according to claim 1, wherein the top layer is the reaction product of a composition 20% by weight of a hydroxyl group containing, hightly cross-linked polyester, 21% by weight of a multi-functional polyether alcohol, 0.5% by weight of dibutylstannic dilaurate or stannic octoate, 0.5 by weight of ultra-violet absorber, 12% by weight of pigments, and 46% by weight of isophorone di-isocyanate.

4. The carrier according to claim 1, wherein the top layer is 0.5 to 0.3 mm. thick.

5. The carrier according to claim 1, wherein the top layer includes a fiber reinforcement.

6. The carrier according to claim 1, wherein the filling body substantially is the reaction product of a mixture of polyether polyolene with isocyanates.

7. The carrier according to claim 1, wherein the filling body has a density range from about 50 to 120 kg/m$^3$.

8. The carrier according to claim 7, wherein the filling body has a density of about 70 kg/m$^3$.

9. The carrier according to claim 6, wherein the density of said filling body is substantially higher in the area adjoining said top layer.

10. The carrier according to claim 9, wherein the rigid, expanded foam in the denser area has a density of about 600 to 1000 kg/m$^3$.

11. The carrier according to claim 1, wherein a fiber reinforcing structure is embedded in said filling body.

12. The carrier according to claim 11, wherein the reinforcing structure comprises long-length fibers selected from the group consisting of mineral or synthetic fibers.

13. The carrier according to claim 11, wherein the fiber reinforcing structure is completely interspersed with the foamed material.

14. The carrier according to claim 11, wherein the fiber structure is a fiber bunch.

15. The carrier according to claim 1, including means for supporting and utilizing solar collector panels, glass, and the like therein.

16. The carrier according to claim 15, wherein said supporting and retaining means comprises a mashing frame, said mashing frame and said carrier having cooperating interlocking means for securing said mashing frame to said carrier.

17. The carrier according to claim 16, including slot means formed in the peripheral edge thereof and said mashing frame includes means for insertion in said slot means.

18. The carrier according to claim 17, wherein at least two slots are formed, said slots being mutually offset in their height.

19. The carrier according to claim 1 including means for interconnecting said carrier to another of similar construction.

20. The carrier element according to claim 19, wherein one portion of the edge of said carrier is formed with an overhanging and angular-offset member corresponding to a matching recess formed along the opposite edge portion whereby said carrier may be interconnected with a similarly formal carrier.

21. The carrier according to claim 1 including a glass fleece mat is arranged on the bottom surface.

22. The carrier according to claim 19, including bracket means for attaching said carrier to a supporting surface.

23. The carrier according to claim 22, wherein said bracket is embedded in said body and is provided with projecting members extending into said body.

24. The carrier according to claim 1, including at least one necessary part selected from a glass masking frame, an absorber panel and a supporting brace, said accessory part being integrally formed with said carrier.

25. The carrier according to claim 24, said accessory parts being molded in situ within the carrier.

26. The carrier according to claim 25 including anchoring brackets formed integrally with said carrier.

* * * * *